(12) United States Patent
Yamada et al.

(10) Patent No.: US 8,488,474 B2
(45) Date of Patent: Jul. 16, 2013

(54) FEED LINE MONITOR APPARATUS

(75) Inventors: Tetsushi Yamada, Kawasaki (JP);
Norihumi Ikeda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 368 days.

(21) Appl. No.: 12/775,255

(22) Filed: May 6, 2010

(65) Prior Publication Data
US 2010/0284285 A1    Nov. 11, 2010

Related U.S. Application Data

(63) Continuation-in-part of application No. 11/462,146, filed on Aug. 3, 2006, now abandoned.

(30) Foreign Application Priority Data

Mar. 24, 2006  (JP) ................................. 2006-083859

(51) Int. Cl.
*H04L 12/26* (2006.01)

(52) U.S. Cl.
USPC .......................................... 370/241; 370/463

(58) Field of Classification Search
None
See application file for complete search history.

(56) References Cited

U.S. PATENT DOCUMENTS

| | | | |
|---|---|---|---|
| 5,689,395 A | 11/1997 | Duffy et al. | |
| 6,140,911 A | 10/2000 | Fisher et al. | |
| 6,282,169 B1 | 8/2001 | Kiremidjian | |
| 6,304,088 B1 | 10/2001 | Yee | |
| 6,535,983 B1 | 3/2003 | McCormack et al. | |
| 6,762,675 B1 | 7/2004 | Cafiero et al. | |
| 6,954,708 B2 | 10/2005 | Rakshani et al. | |
| 7,145,439 B2 | 12/2006 | Darshan et al. | |
| 7,242,764 B2 * | 7/2007 | Miyamoto | 379/413 |
| 7,843,670 B2 * | 11/2010 | Blaha et al. | 361/18 |
| 2003/0122578 A1 | 7/2003 | Masui et al. | |
| 2003/0146765 A1 | 8/2003 | Darshan et al. | |
| 2006/0077888 A1 | 4/2006 | Karam et al. | |
| 2006/0077891 A1 | 4/2006 | Smith et al. | |
| 2006/0078093 A1 | 4/2006 | Karam et al. | |
| 2006/0080573 A1 | 4/2006 | Biederman et al. | |
| 2006/0092826 A1 | 5/2006 | Karam et al. | |
| 2006/0100799 A1 | 5/2006 | Karam | |
| 2006/0109728 A1 | 5/2006 | Dwelley et al. | |
| 2007/0016313 A1 * | 1/2007 | Abe et al. | 700/22 |
| 2007/0165835 A1 * | 7/2007 | Berkman | 379/399.01 |

FOREIGN PATENT DOCUMENTS

JP    2000-244373    9/2000

OTHER PUBLICATIONS

IEEE Computer Society—Sponsored by the LAN/MAN Standards Committee, 802.3af, The Institute of Electrical and Electronics Engineers, Inc., Jun. 18, 2003, pp. 27, 29-30, 32, 34-37, 39-40, 42-43, 45-48.
Celtruda et al., "Remote Unit Ready Indicator," Sep. 1, 1968, IBM Technical Disclosure Bulletin, vol. 11, Issue 4, pp. 367-368.
USPTO, [BEDNASH] "U.S. Appl. No. 11/462,146 (parent)",[CTNF] Non-Final Rejection issued on Oct. 17, 2008.
USPTO, [BEDNASH] "U.S. Appl. No. 11/462,146 (parent)",[CTFR] Final Rejection issued on May 6, 2009.
USPTO, [BEDNASH] "U.S. Appl. No. 11/462,146 (parent)",[CTNF] Non-Final Rejection issued on Nov. 6, 2009.

* cited by examiner

*Primary Examiner* — Chi Pham
*Assistant Examiner* — Soon-Dong D Hyun
(74) *Attorney, Agent, or Firm* — Fujitsu Patent Center

(57) ABSTRACT

A power reception apparatus receives feed information from a predetermined line of a communication cable and judges a state of the power reception apparatus. If the state is normal, it transmits the feed information by returning it to a line which is a pair with the predetermined line.

11 Claims, 9 Drawing Sheets

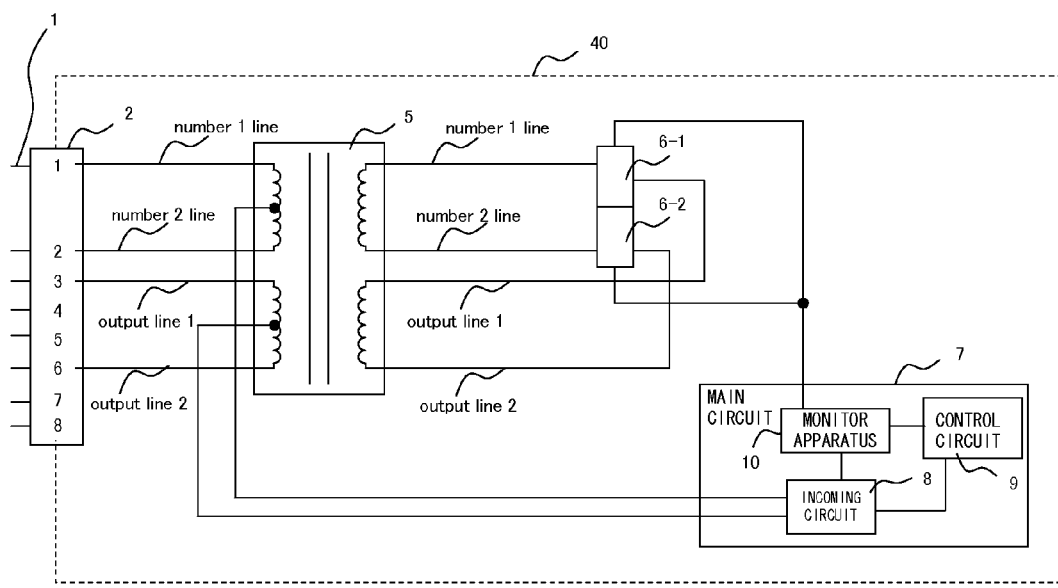
F I G. 4

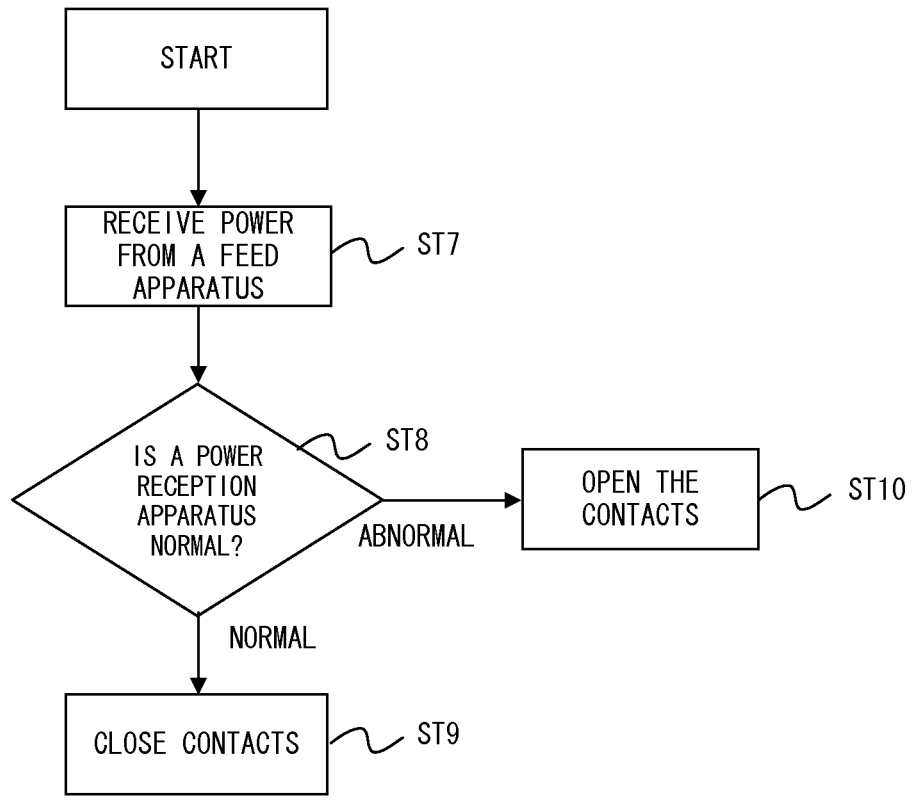
F I G. 5 B

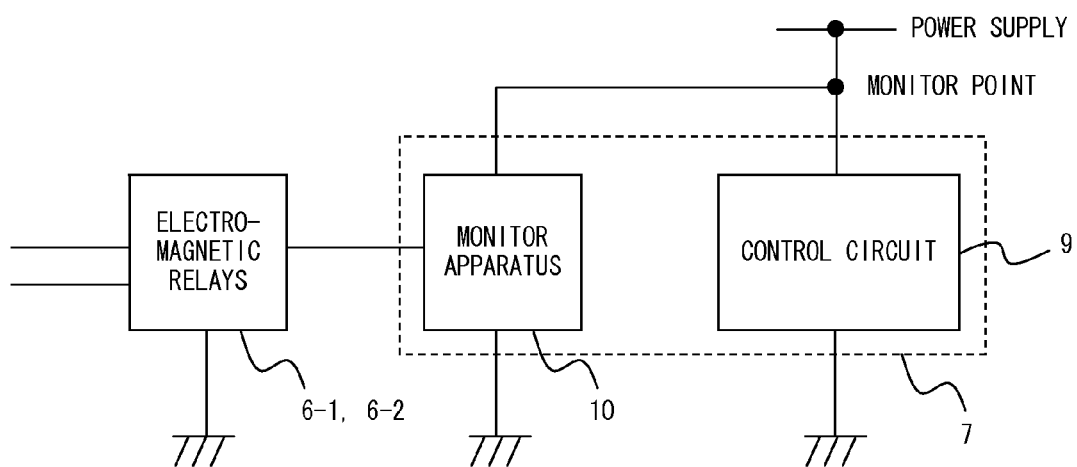
F I G. 6

US 8,488,474 B2

FEED LINE MONITOR APPARATUS

CROSS-REFERENCE TO RELATED APPLICATIONS

This is a continuation-in-part of U.S. application Ser. No. 11/462,146, filed on Aug. 3, 2006, which is now pending and claims priority to Japanese Patent Application No. 2006-083859. The entire contents of each of these applications is hereby incorporated by reference.

FIELD

The present invention relates to a feed line monitor apparatus and a related program for such a local area network (LAN) system applied by a standard specification IEEE802.3af.

BACKGROUND

In recent years, the American Institute of Electrical and Electronics Engineers has proposed a standard by the name of IEEE802.3af. This is a standard for a circuit equipping a feed circuit on the conventional signal transmission circuit, which is a standard for feeding also an electric power through a signal line, such as a LAN cable, for transmitting and receiving signals.

FIG. 1 is a diagram showing an eight-line LAN cable 1, for use in the standard, which is connected to a connector 2 (e.g., RJ45 type connector 2), where the pin numbers "1, 2, 3 and 6" are used for a data transmission and also for feeding power. When feeding, the pin numbers "1 and 2" are used for applying a voltage up to 48 volts, while the pin numbers "3 and 6" are used for a ground (GND) voltage.

Meanwhile, the pin numbers "4, 5, 7 and 8" are spared, except for the case of using them for a data transmission and feeding power.

FIG. 2 is a diagram showing a system utilizing the above noted LAN cable 1. A communication apparatus A communicates with a communication apparatus B and also feeds power thereto. Taking the communication apparatus A as a feed apparatus 3 and the communication apparatus B as a power reception apparatus 4, the power reception apparatus 4 for use as per the IEEE802.3af commonly comprises a incoming circuit 4-1, a PHY 4-2 and a field programmable array gate array (FPGA) 4-3 as shown in FIG. 3.

The incoming circuit 4-1 is a circuit for receiving a power supplied from a feed apparatus.

The PHY 4-2 is a circuit for converting a data format handled by a physical layer of an OSI layer model into a data format which is handled by a data link layer. The OSI layer model is a hierarchical layer structure model for a communication function based on the Open Systems Interconnection (OSI) which is a design policy of a network structure established by the International Organization for Standardization (ISO).

The FPGA 4-3, being an integrated circuit allowing a change of operations of a logic circuit, is for carrying out data process at the power reception apparatus 4.

In a communication apparatus compliant to the IEEE802.3 Standard supporting a communication and a feed by a single communication cable, the already known is a technique of a complex electric circuit and a highly integrated circuit, e.g., a technique for communication to transmit contact information of the communication apparatus and communication cable to an opposite apparatus with the above noted PHY, FPGA.

[Patent document 1] Laid-Open Japanese Patent Application Publication No. 2000-244373

The conventional technique is actually useful for a transmission using a communication apparatus which carries out a high level communication. However, when considering a relay as a communication apparatus for example, a PHY or an FPGA has been equipped with the communication apparatus which is used as the relay even in the case of only monitoring an abnormality of the relay. That is, in the case of communicating between the first and second communication apparatuses by using a relay, a complex PHY or FPGA has been required for establishing a connection between the relay and a third communication apparatus even when detecting a presence or absence of an abnormality of the relay by the third communication apparatus equipped with a feed function, which is connected to the relay of a feed voltage of an equipment connected to the relay. Equipping a using equipment with these apparatuses levies a large load in terms of design period, evaluation period, cost, et cetera, thus requiring a simple apparatus instead.

SUMMARY

Accordingly in consideration of the above described situation, the present invention is to provide an apparatus for accomplishing an establishment, when it is required, of a physical connection which is controlled in a physical layer without using an apparatus such as a PHY or an FPGA.

A first embodiment of the present invention provides a feed control program comprising the steps of detecting an existence of a power reception side and transmitting a link signal thereto by transmitting a voltage thereto; judging whether or not a power reception apparatus is normal by a presence or absence of a return to the link signal back to a feed side from the reception side; and the step of continuing a feed if the reception apparatus is normal and stopping the feed if it is not normal.

This comprisal makes it possible to judge a possibility of continuing a feed to a power reception apparatus by a simple configuration.

A second embodiment of the present invention provides a power reception control program, comprising the steps of receiving a signal from a feed side by way of a first transmission path; transmitting a signal to a feed side by way of a second transmission path; and controlling a changeover unit so as to make said reception signal as a transmission signal by returning it if a power reception side is normal and not to return the reception signal as the transmission signal if the power reception side is abnormal.

This comprisal makes it possible to notify a feed apparatus of an abnormality of a power reception apparatus by a simple configuration.

A third embodiment of the present invention provides a relay, being an apparatus for relaying a signal from a first communication apparatus to a second communication apparatus, comprising: a unit for receiving a signal from a third communication apparatus side by way of a first transmission path; a unit for transmitting a signal to the third communication apparatus side by way of a second transmission path; a power reception apparatus comprising a first changeover unit for controlling so as to make said reception signal as a transmission signal by returning it if the relay is normal and not to return the reception signal as the transmission signal if the relay is abnormal; and a second changeover unit for carrying out a communication between the first or second communication apparatuses and the third communication apparatus if the relay is normal, and changing a signal transmission from the first communication apparatus over to the second communication apparatus if the relay is abnormal.

This comprisal enables to notify of an abnormality of a relay and also carry out a fail safe operation by a simple configuration.

The present invention is contrived to enable a discernment of a presence or absence of an abnormality of a power reception apparatus by a simple configuration without using an apparatus such as PHY and FPGA as system which performed data communication by way of feed line.

BRIEF DESCRIPTION OF DRAWINGS

FIG. 4 is a block diagram showing a configuration of a power reception apparatus according to the present invention;

FIG. 5B is a flow chart showing a process on a power reception side;

FIG. 6 is a diagram showing a monitoring method, by a monitor apparatus, for a voltage value applied to a main circuit from a feed circuit;

DESCRIPTION OF EMBODIMENTS

Figure 1:
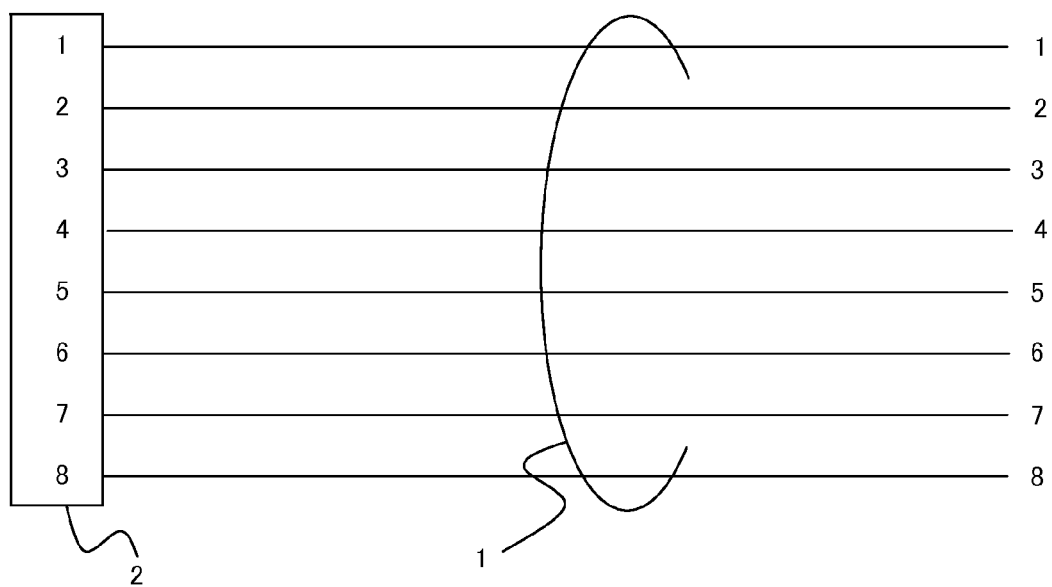
FIG. 1 is a diagram showing an eight-line LAN cable for use as standard for the IEEE802.3af.
Figure 2:
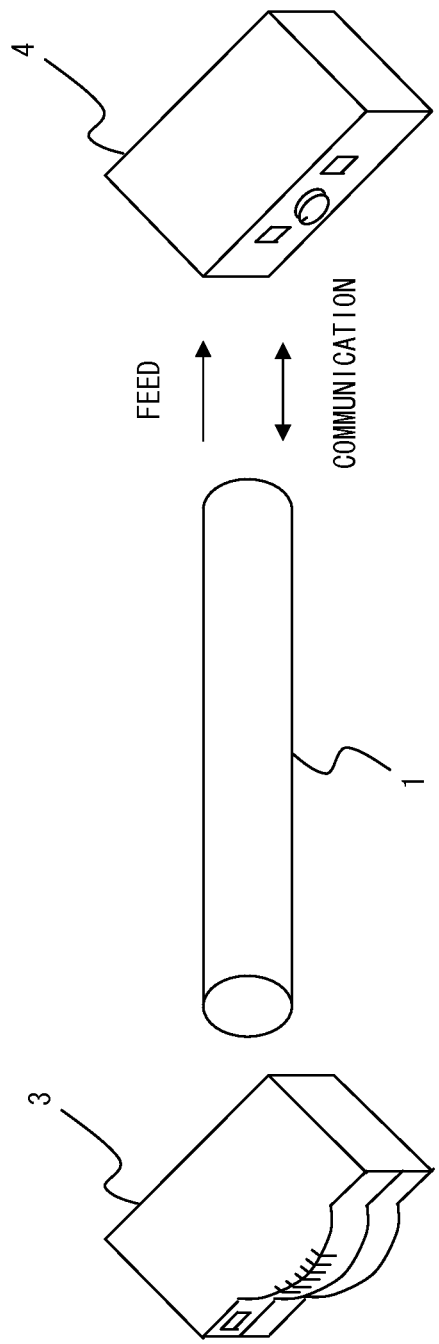
FIG. 2 is a diagram exemplifying an embodiment of a system utilizing a LAN cable.
Figure 3:
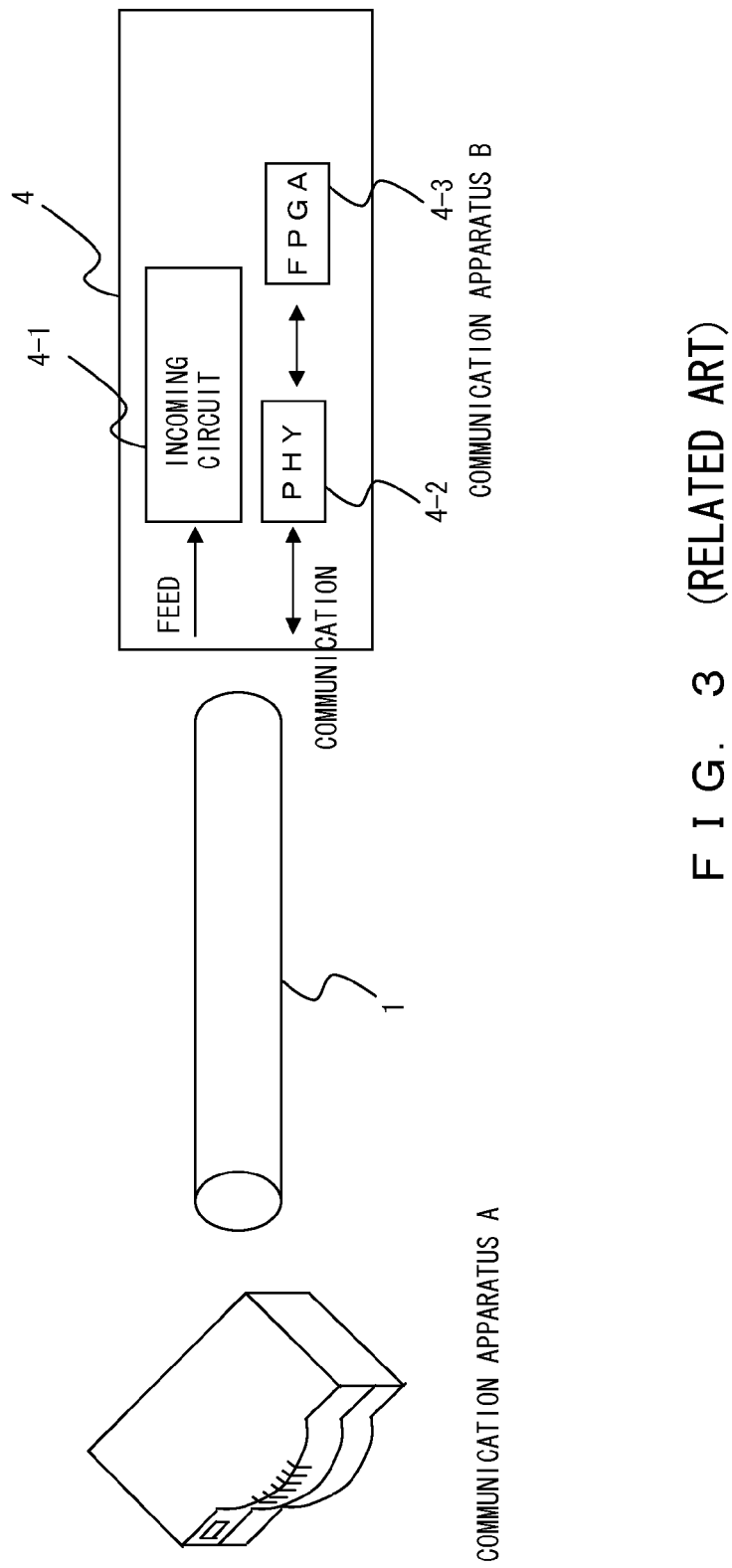
FIG. 3 is a diagram showing a conventional power reception apparatus.

The following is a description of the preferred embodiment of the present invention by referring to the accompanying drawings.

FIG. 4 is a block diagram showing a configuration of a power reception apparatus according to the present invention. The power reception apparatus 40 comprises a connector 2, a transformer 5, electromagnetic relays 6-1 and 6-2, and a main circuit 7.

A "number 1 line" connected to the pin number "1" of the connector 2 is connected to an input contact (not shown herein) of the electromagnetic relay 6-1 by way of the transformer 5. An "output line 1" connected to an output contact of the electromagnetic relay 6-1 is connected to the pin number "3" of the connector 2 by way of the transformer 5.

A "number 2 line" connected to the pin number "2" of the connector 2 is connected to an input contact (not shown herein) of the electromagnetic relay 6-2 by way of the transformer 5. An "output line 2" connected to an output contact of the electromagnetic relay 6-2 is connected to the pin number "6" of the connector 2 by way of the transformer 5.

The transformer 5 is an apparatus for shutting off a DC voltage, that is, a feed voltage and transmitting an AC voltage, that is, a signal component.

If the power reception apparatus 40 is in a normal operating state, the contacts of the electromagnetic relays 6-1 and 6-2 close, making a link pulse a connected state between the pin numbers "1 and 3", and between the pin numbers "2 and 6". The link pulse received from a feed apparatus 3 by way of the line 1 and line 2 of a transmission path 1 comprising a LAN cable is turned back at the electromagnetic relays 6-1 and 6-2, followed by being transmitted to the feed apparatus 3 by way of the lines 3 and 6 of the transmission path 1.

The main circuit 7 comprises an incoming circuit 8 (e.g., a power reception circuit), a control circuit 9 and a monitor apparatus 10.

The incoming circuit 8 is a circuit for supplying the control circuit 9, monitor apparatus 10, et cetera, with power by converting into respectively appropriate voltages based on the power fed between the pin numbers "1 and 2", and between the pin numbers "3 and 6", of the connector 2.

The monitor circuit 10 is a circuit for monitoring a state of the power reception apparatus 4, particularly of the control circuit 9 of the main circuit 7.

Figure 5A:
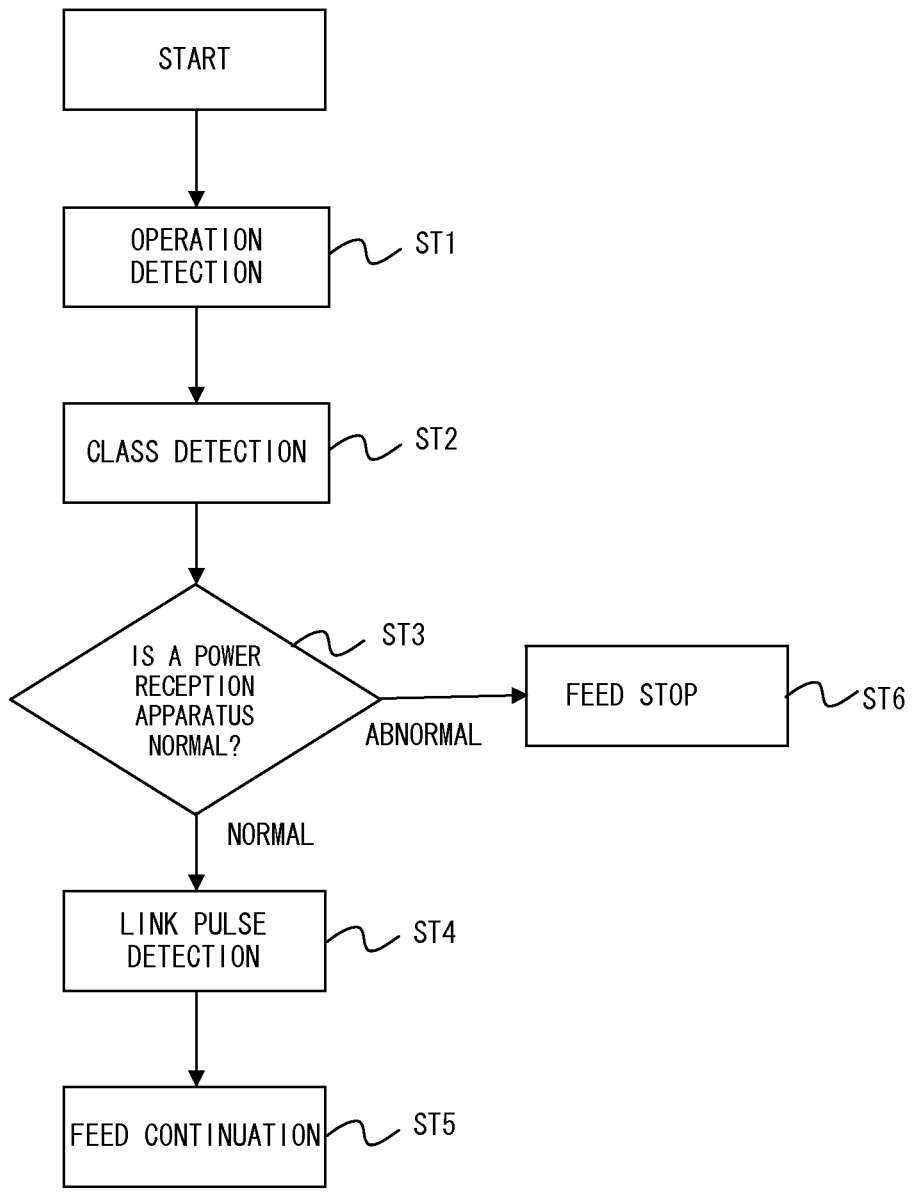
FIG. 5A is a flow chart showing a process on a feed apparatus side.

The following is a description of operations of the feed apparatus and power reception apparatus by referring to the flow charts shown by FIGS. 5A and 5B. The first description is of the flow chart of FIG. 5A showing a process of the feed apparatus.

According to the standard of the IEEE802.3af, the feed apparatus 3 validates an operation of the power reception apparatus 4 (ST1) and detects a class thereof (ST2). The validation of an operation is performed by detecting a current by applying a voltage to a termination resistor. The detection of a class is performed by applying voltages in a certain range in a certain range of time and selecting a class by categorizing the maximum power consumption of the power reception apparatus based on the currents. Having detected a class of the power reception apparatus 4, the power suitable to the class is supplied.

Then, the feed apparatus 3 confirms that the connected power reception apparatus 40 is normal, or not (ST3). A method for confirming the power reception apparatus 40 is normal is to utilize a validation signal called a link pulse which has been transmitted from the pin numbers "1 and 2" of the connector 2 of the feed apparatus 3. In this event, the conventional power reception apparatus 4 equipped with a PHY would have received a link pulse transmitted from a feed apparatus and also would have transmitted a response signal from the pin numbers "3 and 6" of the connector 2. Contrarily, the present invention is configured to not comprise a PHY, and therefore is not able to transmit a response signal to the feed apparatus. The feed apparatus has already recognized a use of the power reception apparatus 40 unequipped with a PHY. The present invention is configured to validate a normality of the power reception apparatus by detecting a return of the transmitted link pulse by way of the electromagnetic relays 6-1 and 6-2.

If the power reception apparatus 40 is operating normally ("normal" in ST3), the contacts of the electromagnetic relays 6-1 and 6-2 are closed, and therefore the link pulse transmitted from the feed apparatus 3 is returned by way of the electromagnetic relays 6-1 and 6-2. Having detected the returned link pulse (ST4), judging that the power reception apparatus 4 is normal, the feed apparatus 3 accordingly continues the feed (ST5).

If the power reception apparatus 4 is operating abnormally ("abnormal" in ST2), the contacts of the electromagnetic relays 6-1 and 6-2 are open and the link pulse is not returned, and the feed apparatus stops the feed by judging an abnormality (ST6).

The next is a description of the flow chart of a process over at the power reception apparatus 40 with reference to FIG. 5.

Having been fed from the feed apparatus (ST7), the power reception apparatus 40 closes the contacts of electromagnetic relays 6-1 and 6-2 (ST9), if the apparatus per se is operating normally ("normal" in ST8). Contrarily, if the apparatus per se is operating abnormally ("abnormal" in ST8), the power reception apparatus 40 opens the contacts of the electromagnetic relays 6-1 and 6-2 (ST10).

The execution of the above described process establishes a connection of the power reception apparatus to the feed apparatus. Note that the above description is of the case of feeding by using the pin numbers "1, 2, 3 and 6" of the connector 2, it is, however, possible to accomplish likewise the case of feeding by using the pin numbers "4, 5, 7 and 8". In such a case, the feed circuit 8 is connected to the pin numbers "4, 5, 7 and 8".

The following is a description of a concrete embodiment of a monitor method.

As shown by FIG. 6, the monitor apparatus 10 monitors a voltage value applied to the control circuit 9 from a power supply. If the voltage value is equal to or greater than a certain threshold value (e.g., 3.3 volts), the control circuit 9 is judged to be normal. Contrarily, if it is less than a threshold value (e.g., 1.7 volts) as a result of a failure occurrence, the control circuit 9 is judged to be abnormal. An output of the monitor apparatus 10 is sent to the electromagnetic relays 6-1 and 6-2 shown in FIG. 4 and used for an open/close changeover operation thereof.

Figure 7:
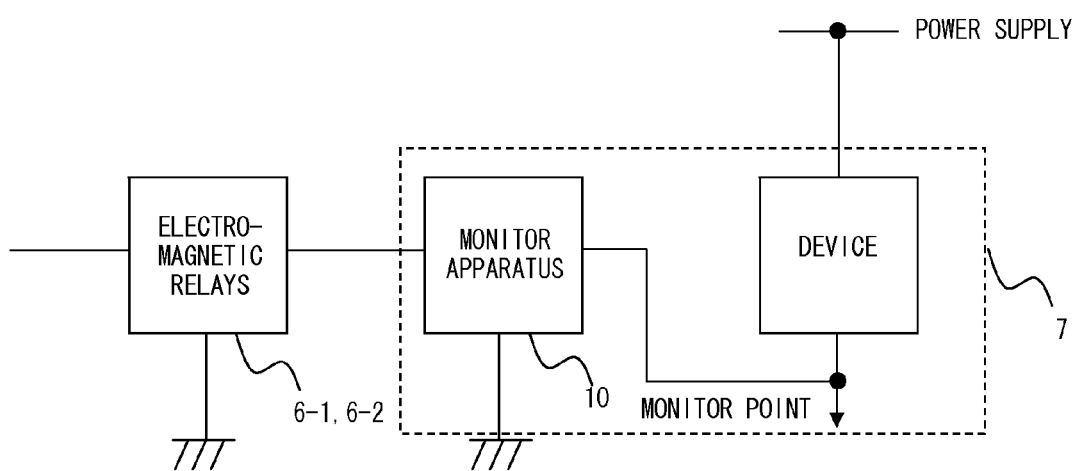
FIG. 7 is a diagram showing a method for monitoring a voltage value at a specific device within a main circuit.

As shown by FIG. 7, there is another method for monitoring a voltage value in the inside, or an output of, a specific device within a control circuit as another embodiment. If the voltage value greater than a certain original value (e.g., A volts), the control circuit 9 is judged to be normal. However, if a failure occurs, causing a value to be lower that the original value (e.g., 0 volt), it is judged to be abnormal.

Figure 8:
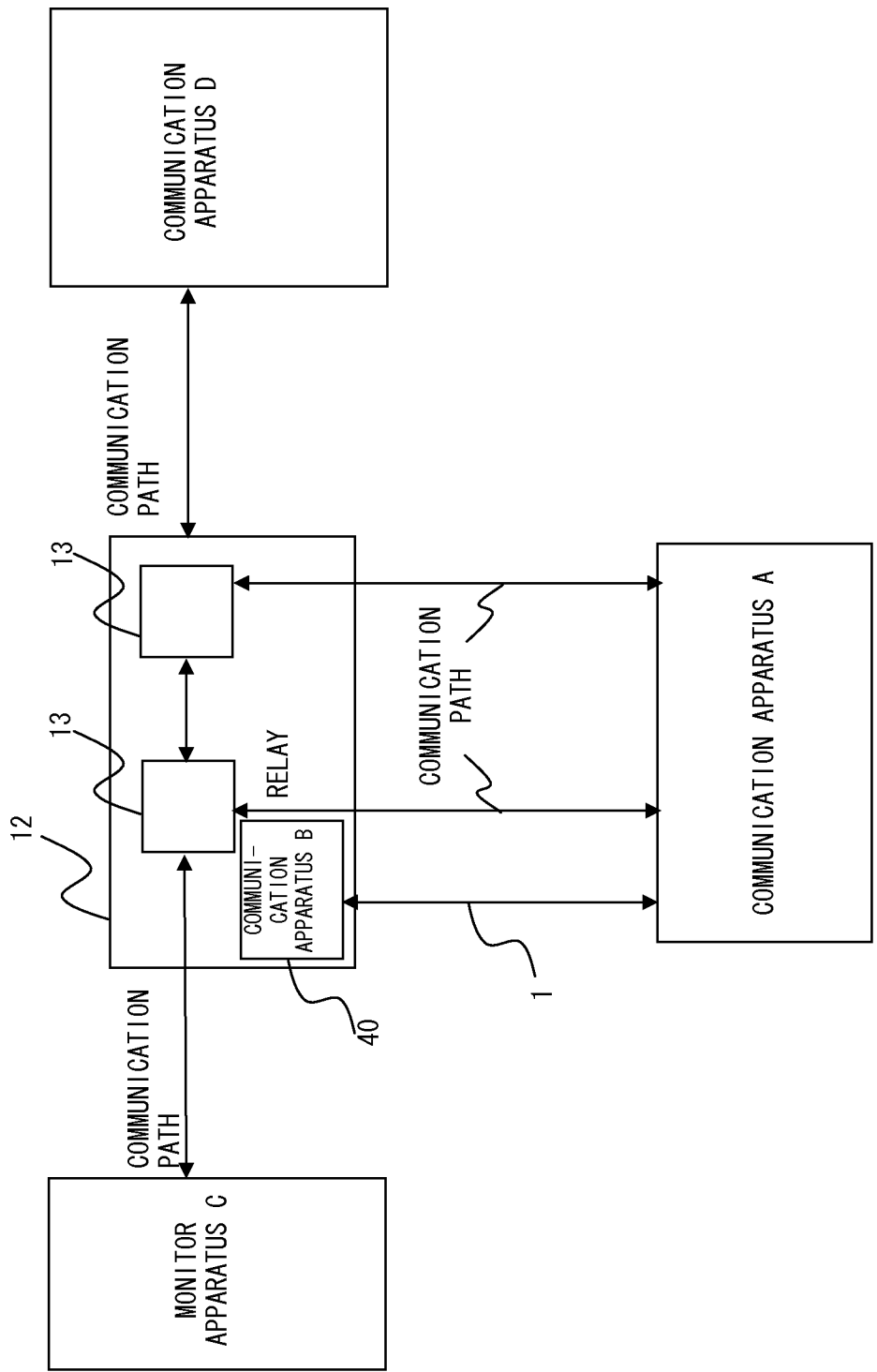
FIG. 8 is a block diagram of a system using a power reception apparatus according to the present invention.

The next description is of a concrete embodiment at the time of using the power reception apparatus 40 according to the present invention. FIG. 8 shows a block chart of the system. The power reception apparatus 40 according to the present invention is equipped in the inside of a relay 12 that is a changeover apparatus performing an Add/Drop operation. The relay 12 relays a communication between apparatuses C and D.

A communication apparatus A is connected to the relay 12 by way of a communication path and an eight-line LAN cable 1.

The communication apparatus A is a feed apparatus, and the relay 12 is equipped with a power reception apparatus 40 which is equivalent to a communication apparatus B.

As the communication apparatus A is connected to the power reception apparatus 40 within the relay 12 by the process of the flow chart described for FIGS. 5A and 5B, a data communication between the communication apparatuses C and D enables the communication apparatus A to operate an Add/Drop by way of relay 12.

However, if a certain failure occurs in the relay 12, a feed thereto from the LAN cable 1 stops. As the feed stops, the electromagnetic relays 6-1 and 6-2 of the power reception apparatus 40 open, thereby interrupting a feed from the communication apparatus A to the power reception apparatus 40, opening a contact of a first electromagnetic relay (not shown herein) of a switch 13 and shutting off a communication between the relay 12 and communication apparatus A (stopping an Add/Drop operation).

In this event, the switch 13 of the relay 12 changes over to a direction so as to close a contact of a second electromagnetic relay (not shown herein) and also secure a communication between the communication apparatuses C and D. That is, to result in opening the contact for the relay 12 communicating with the communication apparatus A, while closing the contact for connecting the communication apparatus C with the D in the switch 13.

As such, the relay 12 is used for a fail safe for the communication apparatuses C and D.

While the embodiment applying the present invention has so far been described, the present invention can adopt various configurations possible within the scope thereof, in lieu of being limited by the above described embodiment.

What is claimed is:

1. A feed control method comprising:
   detecting power consumption of a power reception side;
   supplying power suitable to the detected power consumption from a feed side to the power reception side;
   transmitting a link signal from the feed side to the power reception side by way of a first transmission path by feeding a voltage thereto;
   closing a contact of a relay at the power reception side, the contact being connected to the first transmission path and a second transmission path by way of a transformer, to return the link signal when a power reception apparatus is normal and opening the contact not to return the link signal when the power reception apparatus is abnormal;
   judging whether or not the power reception apparatus is normal based on return of the transmitted link signal from the reception side by way of the second transmission path;
   continuing the feeding the voltage when the power reception apparatus is judged normal; and
   stopping the feeding the voltage when the power reception apparatus is abnormal.

2. A power reception control method comprising:
   receiving a voltage and a link signal from a feed side by way of a first transmission path;
   transmitting the link signal to a feed side by way of a second transmission path; and
   judging whether or not a power reception side is normal by monitoring the voltage from a feed side, wherein the judging judges the power reception side to be normal when the voltage value is equal to or greater than a certain threshold value;
   controlling a changeover unit to return received link signal as a transmission signal to the feed side when the power reception side is normal, and not to return the received link signal as the transmission signal to the feed side when the power reception side is abnormal, wherein
   the changeover unit includes a relay including a contact connected to the first transmission path and the second transmission path by way of a transformer and the relay closes the contact to return the received link signal when the power reception side is normal and opens the contact not to return the received signal when the power reception side is abnormal.

3. A power reception apparatus, comprising:
   an interface to receive a voltage and a link signal from a feed side by way of a first transmission path and to transmit the link signal to the feed side by way of a second transmission path; and
   a monitoring module to judge whether or not a power reception side is normal by monitoring the voltage from a feed side, wherein the monitoring module judges the power reception side to be normal when the voltage value is equal to or greater than a certain threshold value;
   a changeover unit including a relay including a contact connected to the first transmission path and the second transmission path by way of a transformer, wherein
   the relay closes the contact to return the received link signal as a transmission signal to the feed side when a power reception side is normal and opens the contact not to return the received link signal when the power reception side is abnormal.

4. The power reception apparatus according to claim 3, further comprising:
a connector equipped as an interface with the feed side, wherein
a reception signal output from the connector is added to the transformer and the transformer transmits the reception signal to said changeover unit and separates a feed signal.

5. The power reception apparatus according to claim 3, wherein
said first and second transmission paths are for a power reception side receiving power from the feed side, and also for providing a reception path and a transmission path.

6. The power reception apparatus according to claim 3, wherein
said first and second transmission paths are Local Area Network.

7. The power reception apparatus according to claim 3, further comprising:
an abnormality detection unit to detect an abnormality of the power reception apparatus by a change of a voltage.

8. The power reception apparatus according to claim 7, wherein
said abnormality detection unit detects a voltage of a terminal connected to a power supply.

9. The power reception apparatus according to claim 7, wherein
said abnormality detection unit detects a voltage at a specific point within the apparatus.

10. A feed apparatus, comprising:
a detector to detect power consumption of a power reception side;
a unit to supply power suitable to the detected power consumption to the power reception side;
a transmitter to transmit a link signal to the power reception side by way of a first transmission path after the power consumption of the power reception side is detected;
a judgment unit to judge whether or not a power reception apparatus is normal based on return of the transmitted link signal from the power reception side by way of a second transmission path; and
a feeding unit to continue feeding the power reception side when the power reception apparatus is normal, wherein
the power reception side includes a relay including a contact connected to the first transmission path and the second transmission path by way of a transformer and the relay closes the contact to return the link signal when the power reception apparatus is normal and opens the contact not to return the link signal when the power reception apparatus is abnormal.

11. A relay, being an apparatus for relaying a signal from a first communication apparatus to a second communication apparatus, comprising:
a unit for receiving a signal from a third communication apparatus side by way of a first transmission path;
a unit for transmitting a signal to the third communication apparatus side by way of a second transmission path;
a power reception apparatus comprising a first changeover unit for controlling so as to make said reception signal as a transmission signal by returning the reception signal when the relay is normal and not to return the reception signal as the transmission signal when the relay is abnormal; and
a second changeover unit for carrying out a communication between the first or second communication apparatus and the third communication apparatus when the relay is normal, and changing a signal transmission from the first communication apparatus over to the second communication apparatus when the relay is abnormal, wherein
the first changeover unit includes a contact connected to the first transmission path and the second transmission path by way of a transformer and the first changeover unit closes the contact to return the reception signal when the relay is normal and opens the contact not to return the reception signal when the relay is abnormal.

* * * * *